B. BORLAND.
MOVING PICTURE MACHINE.
APPLICATION FILED JULY 30, 1908. RENEWED FEB. 16, 1911.
1,106,076.
Patented Aug. 4, 1914.
4 SHEETS—SHEET 2.
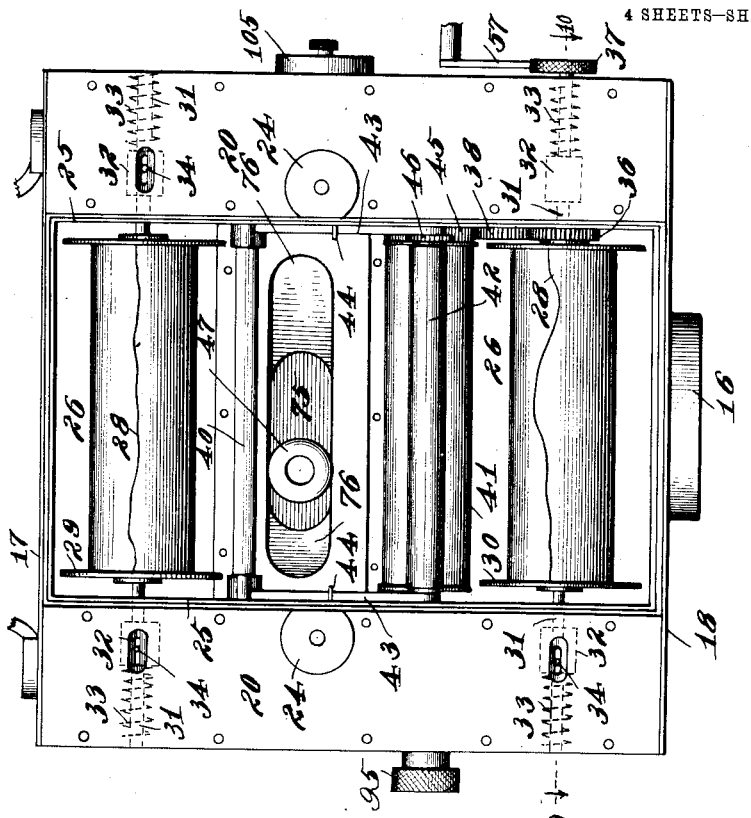
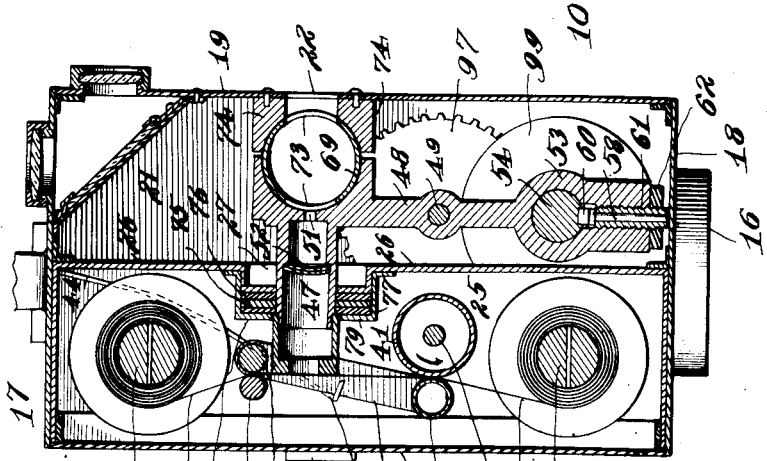
Witnesses:
Inventor
Bruce Borland
By Coburn & McRoberts
his Attys

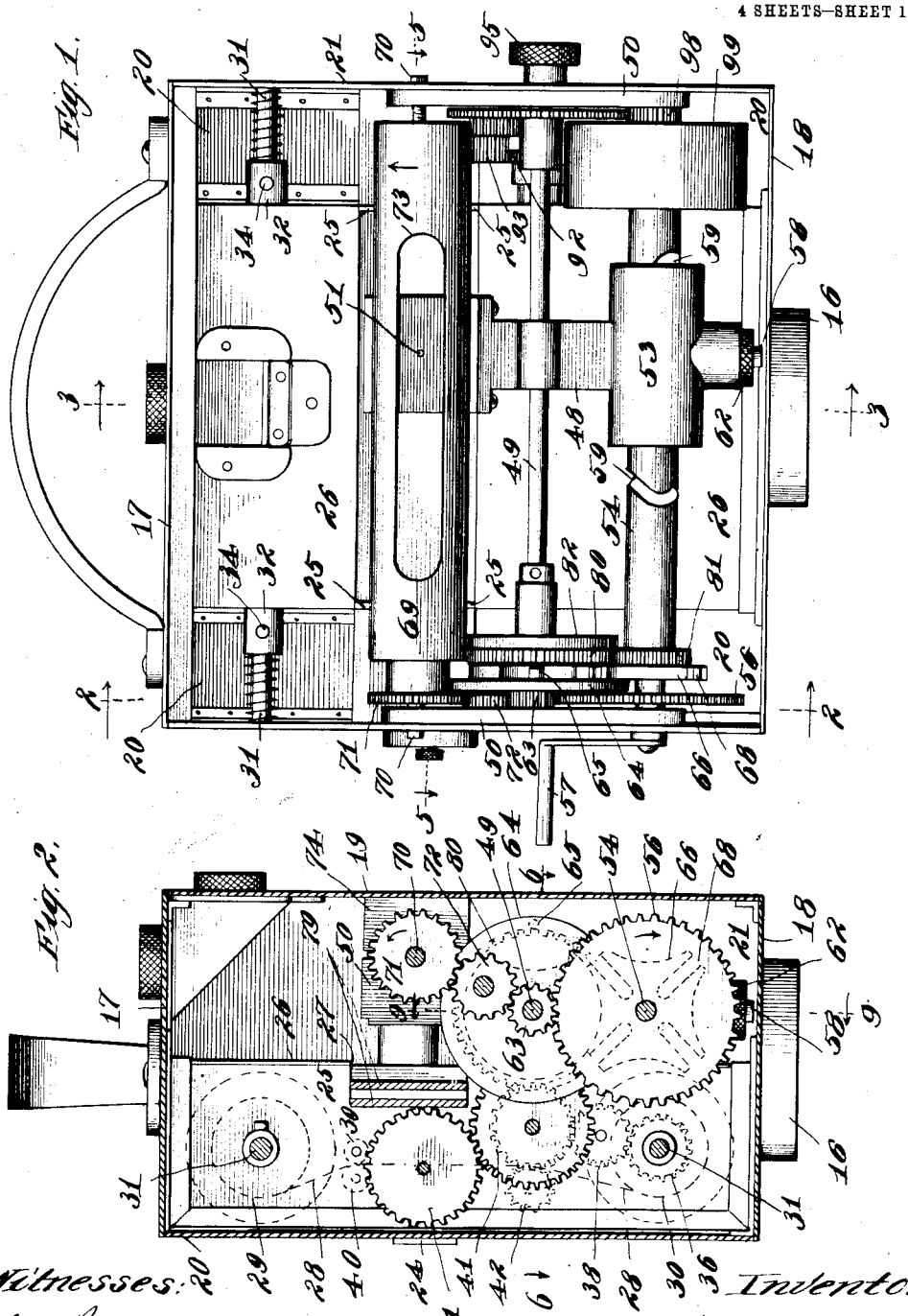

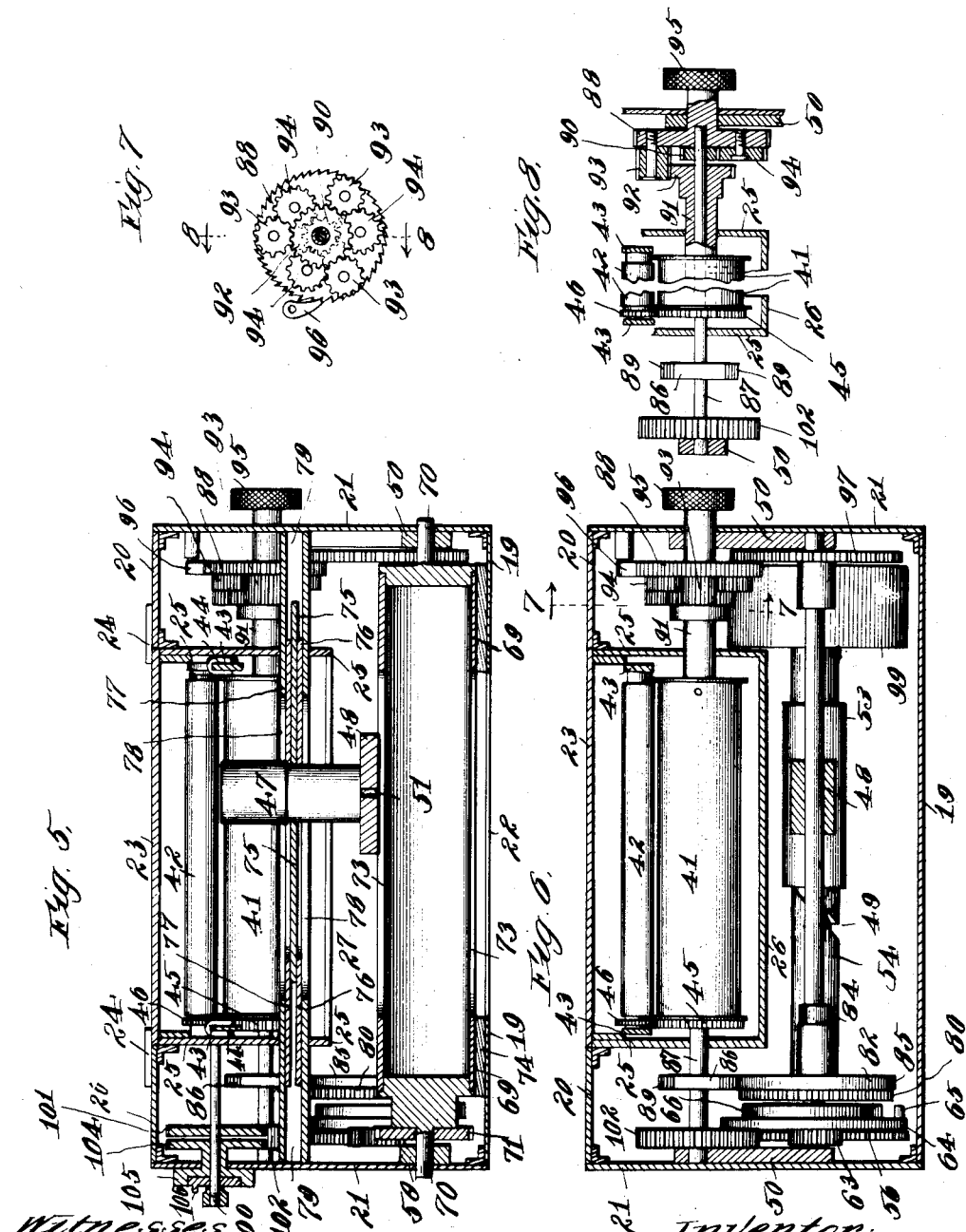

B. BORLAND.
MOVING PICTURE MACHINE.
APPLICATION FILED JULY 30, 1908. RENEWED FEB. 16, 1911.
1,106,076.
Patented Aug. 4, 1914.
4 SHEETS—SHEET 4.
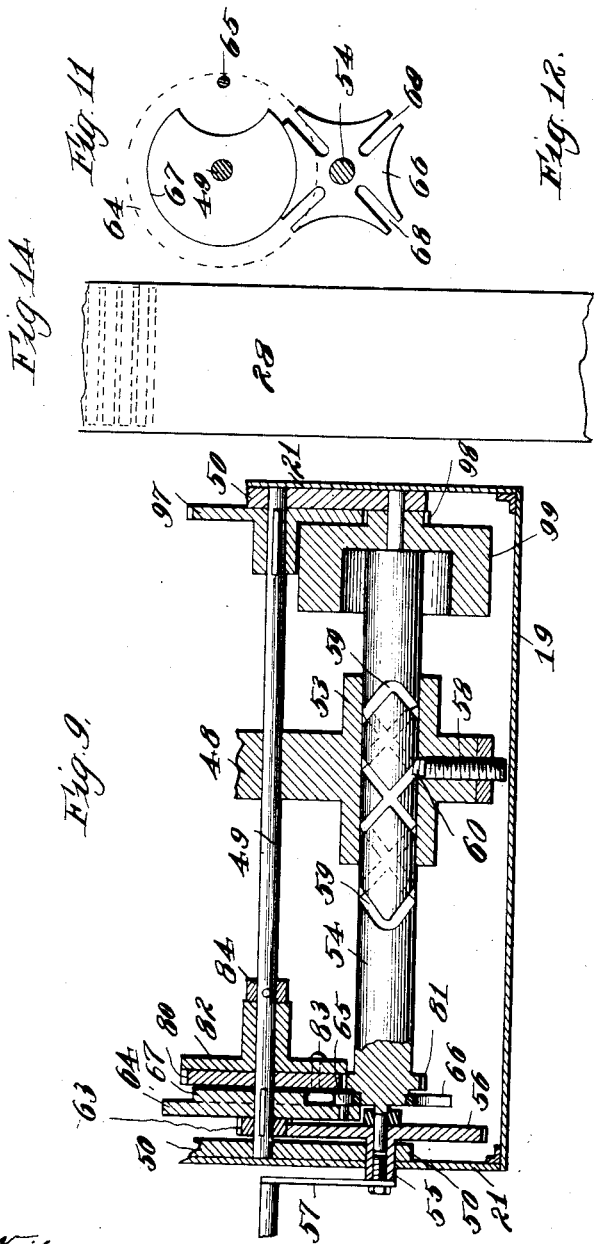
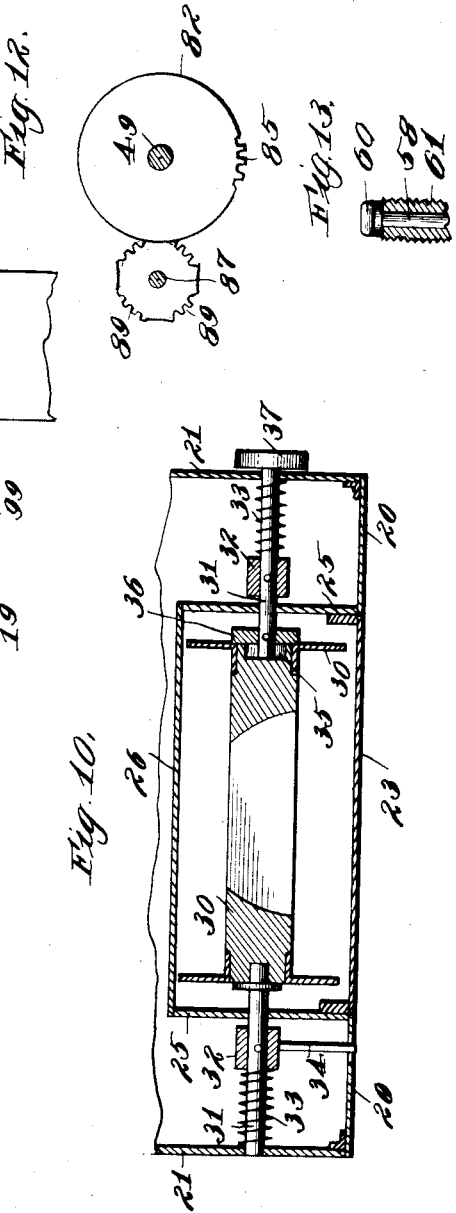
Witnesses:
Inventor
Bruce Borland
By Coburn & McRoberts
his Attys

UNITED STATES PATENT OFFICE.

BRUCE BORLAND, OF CHICAGO, ILLINOIS.

MOVING-PICTURE MACHINE.

1,106,076.      Specification of Letters Patent.      Patented Aug. 4, 1914.

Application filed July 30, 1908, Serial No. 446,034. Renewed February 16, 1911. Serial No. 608,981.

*To all whom it may concern:*

Be it known that I, BRUCE BORLAND, a citizen of the United States, residing at Chicago, in the county of Cook and State of Illinois, have invented certain new and useful Improvements in Moving-Picture Machines, of which the following is a specification, reference being had therein to the accompanying drawing.

My invention relates to apparatus for taking or exhibiting moving pictures and is intended primarily to provide an apparatus in which while the picture is produced or reproduced the film travels in the direction of its length, as is usual in that class of machines in which the photos extend in series along the length of the film, and the objective or projector moves back and forth across the film, so that the pictures are taken or produced upon the film in a series of parallel paths or lines extending across it, or are projected or reproduced from a film having its pictures arranged in parallel transverse lines or paths.

The present invention proceeds upon the principle of feeding or moving the objective or projector, according as the machine is used for taking or exhibiting pictures, back and forth across the width of the film, and of moving the film in the direction of its length, the number of photos in each transverse series being varied according to the relation of their size to the width of the film, and the film being moved step by step in the direction of its length at the end of each movement of the objective or projector across it. This mode of procedure or operation may be carried out by mechanism widely different in their details of construction and arrangement, and in the accompanying drawings I illustrate one practical form of embodiment, in which—

Figure 1 is a front view of the apparatus with the front side of the casing removed to more clearly illustrate the arrangement of the internal parts; Fig. 2 is a transverse vertical sectional view on the line 2—2 of Fig. 1; Fig. 3 is a transverse vertical sectional view on the line 3—3 of Fig. 1; Fig. 4 is a rear view with a portion of the rear side of the casing removed and part of the film broken away for the purpose of better illustrating other parts; Fig. 5 is a longitudinal horizontal sectional view on the line 5—5 of Fig. 1; Fig. 6 is a longitudinal horizontal sectional view on the line 6—6 of Fig. 2; Fig. 7 is a view partly in section and partly in elevation on the line 7—7 of Fig. 6; Fig. 8 is a view partly in top plan and partly in section, the sectional portion thereof being on the line 8—8 of Fig. 7; Fig. 9 is a view partly in elevation and partly in section, the sectional portion thereof being on the line 9—9 of Fig. 2; Fig. 10 is a transverse horizontal sectional view on the line 10—10 of Fig. 4; Fig. 11 is a detail view of the Geneva-stop mechanism employed; Fig. 12 is a detail view of an intermittent gear; Fig. 13 is a detail view of the pin connecting the movable frame to the endless screw shaft, and Fig. 14 is a diagrammatic view of a section of film employed showing the arrangement of the photos thereon in parallel transverse paths or lines.

While the apparatus may be employed for either taking or exhibiting pictures, in the subjoined detailed disclosure of the arrangement and operation of parts I describe it with reference to its former use or function, and then later describe it as a picture exhibiting or reproducing device. With this explanation in mind, and referring to the drawings the reference numeral 16 designates the base of the machine which carries a casing composed of suitable top and bottom walls 17 and 18, front and rear walls 19 and 20, and ends 21, the front wall having a substantially central and horizontally extending slot 22, for a purpose hereinafter described, and the rear wall having a removable central section 23 held by suitable turn buttons 24. The interior of the casing is provided with a pair of transverse vertical partitions 25 extending forwardly about half the width of the casing and vertically from the top to bottom at or about the lines of junction of the removable section 23 with the rear walls 20. The transverse partitions 25 are connected at their inner ends by a vertical longitudinal partition 26 extending between the partitions 25 and from the bottom to the top of the casing except for a narrow longitudinal opening 27 therein for movement of the objective or projector as hereinafter explained. These partitions with the removable section 23 form the film-chamber, the removability of the section 23 permitting accesss to this chamber for the purpose of inserting and removing the films and also the placing of a light back of the film when the apparatus is used to reproduce pictures.

In the present illustration the film 28 is mounted upon upper and lower spools or drums 29 and 30 provided with suitable end flanges. The film-drums are removably mounted in the film-chamber in any suitable manner, and in the embodiment here shown they are rotatably mounted upon laterally movable spring-pressed stub-axles 31 which have bearings in the end walls 21 and in the vertical partitions 25, as clearly shown in Fig. 10. Each of the stubs is provided with a collar 32 pinned thereto and between which and the end wall an expansion spring 33 acts to hold the end of the stub in its inward position within its seat in the end of the associated drum. Each of the collars of the upper pair of studs and of the lower left-hand stub has a rearwardly projecting pin 34 rigid therewith and passing through an elongated slot in the rear walls 20, as clearly shown in Figs. 4 and 10, so that the operator by pressing the pins 34 outward or toward the ends of the casing may release the stubs from engagement with the film-drums. The right-hand stub of the lower drum 29 is utilized to rotate the drum and for this purpose carries at its inner end an irregular shaped head 35 which engages in a correspondingly shaped seat in one end of the lower drum, so that as this stub is rotated it transmits motion to the drum. This stub is provided inside the film-chamber with a gear 36 at or near its head 35 and which is so arranged that when motion is imparted to the gear it rotates the stub while the stub may be rotated in the same direction independently of the gear as by means of the finger-button 37 on its outer end, when for example it may be desired to wind the film upon the lower drum other than in the normal operation of the machine. The gear 36 stands normally inward from the adjacent partition 25 to provide a space for its play when its stub is forced outwardly, and it is made of sufficient width to remain in mesh with its intermediate driving gear 38 in either of its positions.

The film passes from the upper drum 29 between a pair of guide rollers 39 and 40 extending across the film-chamber and adapted to direct the film in a substantially vertical direction to a second pair of lower guides 41 and 42, the bights of the pairs of guides preferably arranged in substantially the same vertical plane. The lower guides are preferably in the form of rollers extending transversely across the film chamber, and one of them may be spring-pressed by any suitable arrangement; in the form shown the guide 42 is carried in the lower ends of a pair of swinging arms 43 which are pivotally mounted upon one of the upper guides, as 39, and are pressed toward the companion guide 41 by means of suitable springs 44, this arrangement of parts being shown in Figs. 3 and 4. By this construction the film is wound from the upper drum 29 upon the lower drum 30 as the latter is revolved by means of its driving stub and pinion 36, and the film travels in a substantially vertical line between its upper and lower sets of guides. The guide rollers 41 and 42 are geared together by the gears 45 and 46 on their respective ends, the gear 45 also meshing with the gear 38 to drive the drum 30, power being supplied as hereinafter described, and the guides and drum revolving in unison, the lower guides serving to draw the film from the upper drum and hold it taut below the upper guides while the lower drum winds it up. The film thus is mounted for movement in the direction of its length in the film-chamber and presents a substantially plane surface between its sets of guides for the objective or projector 47 moving transversely thereof.

The objective or projector 47 is mounted on the upper end of a reciprocating frame 48 which is suitably sleeved upon a suitable bearing and guiding shaft 49 extending across the casing and journal in upright bearing posts 50 at the ends of the casing, the frame being provided with an opening or window 51 of the form and size desired for the pictures in the line of the lens 52. The lower end of the frame 48 is widened to form a sleeve or extended bearing 53 surrounding a shaft 54 which extends parallel with the shaft 49 and whose reduced ends are journaled respectively in one of the posts 50 at one end of the casing and in the trunnion 55 of a gear 56 journaled in the post 50 at the opposite end of the casing and extending therethrough as shown in Fig. 9. The extended end of the trunnion 50 is screw threaded and is adapted to receive the threaded pin of a suitable crank-handle 57 by means of which motion may be imparted to the gear 56. The frame 48 is caused to reciprocate back and forth along the shafts 49 and 54 when the latter is revolved by means of a pin 58 upon the frame engaging endless reverse threads or grooves 59 upon the shaft 54. The pin 58 may be of any suitable form, and in the construction shown it is provided with a head 60 of sufficient width to bridge the intersections of the reverse threads or grooves 59. The pin is loosely carried in the frame so that it may turn on its own axis as it passes from one groove to the reverse groove, and for this purpose it is loosely mounted in a sleeve 61 in which it is free to turn but from which it cannot become displaced by reason of its enlarged head. The bearing 53 is provided with an internally threaded opening with which a corresponding thread on the sleeve engages, the opening terminating in a suitable chamber or enlarged space to receive the head of the pin and allow it to turn; the sleeve is held in place by a lock-nut 62. It is obvious that when the shaft 54 is rotated its rotary motion produces reciprocating rectilinear motion of the frame 48 and its associated objective or projector 47, the latter being mounted in such position as to pass back and forth across that portion of the film extended in a plane between the upper and lower pairs of guides, as clearly shown in Fig. 3. The shaft 54 is intermittently rotated so as to displace or laterally move the part 47 step-by-step to give sufficient pause to the part 47 for each exposure; for this purpose I provide a gear 63 splined upon one end of the shaft 49 and meshing with the gear 56, and a Geneva-stop mechanism between the gear 63 and the shaft 54, illustrated more particularly in Fig. 11. The drive wheel 64 carrying the pin 65 is also splined upon the same end of the shaft 49 adjacent the gear 63, and the slotted star-wheel 66 of this movement is secured to one end of the enlarged portion of the shaft 54; the pin 65 of the wheel 64 acts in the notches or slots 68 of the wheel 66 and turns the latter the distance of one notch or a quarter turn in every revolution of wheel 64, the wheel 66 then being locked by the convex portion of the disk 57 integral with the wheel 64 fitting into the concave portions cut in the circumference of the wheel 66 between its slots or notches. It is obvious from this construction that when the handle 57 is rotated in the direction of the arrow in Fig. 2 the gear 56 is constantly driven in the same direction and in turn drives the gear 63 and the shaft 49 and that the continuous rotary motion of the shaft 49 is imparted to the disks 64 and 67 to cause intermittent rotation of the shaft 54, each rotation of the shaft 49 serving to give the shaft 54 a quarter turn, and that therefore the uniform rotary motion of the handle and shaft 49 produces intermittent reciprocating rectilinear motion of the frame 48 and the objective or projector back and forth across the film.

The obturator is preferably in the form of a revolving shutter 69 mounted in the casing in line with the window 51 and slot 22, and being rotatably mounted upon suitable bearings 70 secured in the ends of the casing and passing through the upper ends of the posts 50. The shutter is provided at one end with a fixed gear 71 adapted to be driven in the direction of the arrows in Figs. 1 and 2 from the gear 63 by means of an intermediate gear 72, as more particularly shown in Figs. 1 and 2. The shutter is in any suitable form and in the illustration shown it consists of a hollow cylinder provided with an oppositely disposed pair of openings or slots 73 adapted to register simultaneously with the slot 22 in the front wall of the casing and with the window 51, as clearly shown in Fig. 3. The upper end of the frame 48 is adapted to pass freely along the shutter as the latter revolves and as shown in Fig. 3 this upper end is suitably curved to conform to the curve of the shutter, the front wall of the casing being also provided with a correspondingly shaped plate 74 having a slot corresponding in shape and contour with the slot 22 and openings 73. The parts are so related and timed that the star wheel 66 is given a quarter turn when the openings of the shutter are out of register with the window 51, the star wheel being locked against rotation by means of the convex disk 67 when the openings of the shutter are in register with the window and with the slot 22.

It is obvious from the foregoing description that the objective or projector is moved back and forth intermittently or step-by-step across the width of the film and that consequently with a suitable intermittent or step-by-step movement of the film in the direction of its length the photos will be produced upon the film in transverse lines or paths or will be presented to the projector in similar paths, these paths or lines being indicated by the dotted lines in Fig. 14 which diagrammatically shows a section of film with the lines of the photos indicated thereon.

The rear end of the objective or projector passes through the opening 27 in the longitudinal partition 26, and in order to close this opening I provide a series of overlapping slides adapted to move with the objective or projector and to effectually close the opening against admission of light to the film chamber. The objective or projector carries a slide 75 consisting of a rectangular plate secured to and surrounding the objective and extending laterally at either side thereof as shown at Fig. 5. The plate 75 is located between a pair of plates 76 and 77 each of which is provided at or near its central portion with an elongated slot or opening 78 through which the part 47 freely passes. The slides are mounted in a suitable guideway 79 provided upon the rear face of the partition 26 in rear of the opening 27. As the part 47 travels from one extreme of its movement toward the other it carries with it the slide 75 and passes through and along the openings in the slides 76 and 77, the lateral portions of the slide 75 closing these openings at all times, and as the part 47 approaches one end of its movement it engages the ends of the openings 78 and carries with it the other slides 76 and 77 until it reaches the end of its path, and upon its reverse travel it again travels the openings in the slide 76 and 77 until it engages the other end of the openings therein when it again carries these slides in the opposite direction until it reaches the other end of its travel. The slide 75 at all times closes the openings through the slides 76 and 77, while the provision of the supplemental slides allows the slide 75 to be shortened so that the part 47 may be given a greater amplitude of travel without the necessity of carrying the ends of the slide 75 through the ends of the casing.

When the objective or projector 47 reaches either end of its travel across the film, it is necessary to move the film in the direction of its length in order that a fresh surface thereof may be exposed to the objective or projector. For this purpose I have devised a suitable film-feeding mechanism which automatically and intermittently operates to displace or move the film step-by-step in the direction of its length across the path of the objective or projector. To this end, when the pin 58 is about to enter a reverse thread or groove, the guide 41 is given a slight movement in the direction of the arrow in Fig. 3, this displacement being only sufficient to bring the next area of the film for a line of photos before the objective or the next line of photos before the projector as the case may be. The shaft 49 carries a gear 80 free to revolve thereon and meshing with a gear 81 integral with one end of the shaft 54 and rotated thereby. The gear 80 is rigidly connected to a driving-wheel 82 by pins 83, the gear and wheel being held against lateral displacement on the shaft 49 by means of the collar 84 on one side and the disk 67 on the other. The driving wheel 82 is provided with three teeth 85 adapted to mesh with teeth of an intermittent gear 86 fixed upon a shaft 87 journaled at one end in an extension of a post 50 and at its other end in the hub of a ratchet wheel 88 journaled in the opposite post 50. The gear 86 is provided with four sets of teeth 89, the sets being spaced apart a quarter of the circumference of the gear, so that as the teeth 85 engage a set of the teeth 89 the gear 86 and shaft 87 will be given a quarter turn, the gear being locked against rotation at other times by the wheel 82 fitting in the hollows cut in its circumference between the sets of teeth, the arrangement of parts being particularly shown in Fig. 12. It is obvious that for the mere purpose of rotating the guide roller the shaft 87 may be directly connected with it, but as I desire to have this roller also rotatable by hand I connect it indirectly to the shaft, it being obvious that the lock of the parts 82 and 86 renders impossible the free rotation of the shaft 87 which would be required to move the roller if the shaft and roller were directly connected. For the purpose of the indirect connection of these parts the shaft 87 is provided with a fixed gear 90 at its end near the ratchet 88, and the roller 41 is carried by a sleeve 91 which is revolubly mounted upon the shaft 87 but is adapted to be connected to the shaft to move with it. For this purpose the sleeve is provided with an integral gear 92 at its outer end and the ratchet 88 is provided on its inner face with a series of three gears 93 meshing with the gear 92 fixed on the sleeve 91, and with a second set of three gears 94 meshing with the gear 90 fixed in the shaft 87, each gear 93 also meshing with a gear 94 being of sufficient width therefore as shown in Fig. 8. When the shaft 87 is displaced or moved a quarter turn the gear 90 moving with it turns the gears 94 which turn the gears 93 and the gear 92 to move or displace the drum 41 and feed the film forward, this action taking place intermittently or step-by-step by reason of the intermittent gear 186. When it is desired to feed the film forward by hand the ratchet 88 may be turned by the handle 95, being held against backward movement by a pawl 96, the gears 93 and 94 rotating the gear 92 as they are moved about gear 90.

The details of the device are clear from the description of its organization, and its essential feature is clear as it is obvious that when the gear 56 is revolved in the direction of the arrow in Fig. 2 by the handle 57, the actuating shaft 54 is revolved or displaced step-by-step to shift the objective or projector intermittently across the film, along one of the transverse dotted lines of Fig. 11, and that when the objective or projector reaches the end of its travel in either direction the film is in turn displaced or moved in the direction of its length sufficiently to bring the next dotted line into the path of the objective or projector during the latter's next movement across the film, the film presenting successive transverse lines or paths to the objective or projector which travels transversely thereof.

While I have described the device more in its aspect of an apparatus to take pictures, it is obvious that it may be used equally as well to project or reproduce pictures already on the film. This may be done by removing the section 23 of the back and suitably arranging a light in the rear of the film. This being so, I wish it to be distinctly understood that the term "lens" in the claims is to be construed to mean either an objective or projector, and that as the mechanism claimed is capable of being used in a camera to take pictures or in a projector to reproduce them the term film includes any suitable picture-receiving or picture-bearing device.

The shaft 49 may be provided with a pinion 97 fixed thereon and meshing with a gear 98 on a fly-wheel 99 sleeved upon one end of the shaft 54.

A counting or registering device may be employed, and for this purpose I provide a short shaft 100 journaled in an end 21 and one of the partitions 25, its outer end projecting outside the casing, as shown in Fig. 5. This shaft carries a gear 101 having 46 teeth, and driven by a gear 102 on the shaft 87 and also having 46 teeth. The shaft 100 carries a sleeve 103 having a gear 104 with 45 teeth also meshing with the gear 102, and a circular disk 105 on the outer side of the casing provided with a scale. The shaft 100 has an index 106 at its outer end.

What I claim is:—

1. In a device of the character described, a film, a suitable lens, mechanism to move the lens back and forth in the direction of the width of the film, and means for supporting and intermittently moving the film in the direction of its length past the lens at the end of the travel of the lens across the film.

2. In a device of the character described, a suitable lens, means for supporting and intermittently moving a film in the direction of its length past the lens, and mechanism for intermittently moving the lens across the film.

3. In a device of the character described, a suitable lens, means for supporting and intermittently moving a film past the lens, mechanism for intermittently moving the lens across the film, and means to automatically actuate the film-moving means at the end of the transverse movement of the lens.

4. In a device of the character described, a suitable lens, means for supporting and moving a film in the direction of its length past the lens step-by-step, mechanism for moving the lens across the film step-by-step, and means to automatically actuate the film-moving means at the end of the transverse movement of the lens.

5. In a device of the character described, a suitable lens, a film holder adjacent the lens, feed-mechanism for moving the film in the direction of its length, a frame for the lens, means for moving the frame step-by-step transversely of the film, and connections between the said feed-mechanism and lens moving-means to actuate the former when the lens reaches its limit of movement.

6. In a device of the character described, a suitable lens, a film holder adjacent the lens, an endless reverse screw to move the lens across the film, means to displace the screw intermittently, and means to automatically move the film at the end of each journey of the lens.

7. In a device of the character described, a suitable lens, a film holder adjacent the lens, an endless reverse screw to move the lens across the film, means to rotate the screw, an intermittent stop-mechanism therefor, and means to automatically move the film at the end of each journey of the lens.

8. In a device of the character described, a suitable lens, a film holder adjacent the lens, an endless reverse screw to move the lens across the film, a rotating shaft, means to intermittently connect the shaft and screw to move the lens, and means to auto- matically move the film at the end of each journey of the lens.

9. In a device of the character described, a suitable lens, a film holder adjacent the lens, means to move the lens back and forth across the film, means to feed the film in the direction of its length at the end of the travel of the lens across the film, a rotating shaft, means to intermittently actuate the film-feeding means from the shaft, and means to intermittently actuate the lens-moving means from the shaft.

10. In a device of the character described, a suitable lens, a film holder adjacent the lens, a rotating shaft, feed mechanism for moving the film in the direction of its length, a frame for the lens, means for moving the frame transversely of the film, an intermittent stop-mechanism between the shaft and lens-moving means, and an intermittent stop-mechanism between the shaft and film-feeding means to actuate the latter when the lens reaches its limit of movement.

11. In a device of the character described, a suitable lens, a film holder adjacent the lens, a rotating shaft, means to feed the film in the direction of its length, an endless reverse screw to move the lens across the film, an intermittent stop-mechanism to actuate the film-feeding means from the shaft, and an intermittent stop-mechanism to actuate the screw from the shaft.

12. In a device of the character described, a suitable lens, a film holder adjacent the lens, a rotating shaft, means to feed the film in the direction of its length, an endless reverse screw to move the lens across the film, an intermittent stop-mechanism to actuate the film-feeding means from the shaft, an intermittent stop-mechanism to actuate the screw from the shaft, an obturator, and means to operate the obturator from the shaft.

13. In a device of the character described, a film, a suitable lens, means for intermittently moving the lens back and forth across the film, means for supporting and intermittently moving the film past the lens at the end of the travel of the lens across the film, and a revolving shutter exposing the lens between its intervals of movement.

14. In a device of the character described, a suitable lens, means for supporting and moving a film in the direction of its length past the lens step-by-step, mechanism for moving the lens across the film step-by-step, and a revolving shutter exposing the lens between its movements.

15. In a device of the character described, a suitable lens, a film holder adjacent the lens, an endless reverse screw to move the lens across the film, a revolving shutter, a rotating shaft, means to intermittently connect the shaft and screw to move the lens, means actuated by the shaft to move the film at the end of each journey of the lens across the lens, and means to revolve the shutter from the shaft.

16. In a device of the character described, a film-chamber having an elongated opening, a film-holder in the chamber, a lens having slides to close said opening, an endless reverse screw to move the lens across the film, and means to displace the screw intermittently.

17. In a device of the character described, a film-chamber having an elongated opening, a film-holder in the chamber, a lens having a series of overlapping slides to close the opening, an endless reverse screw to move the lens across the film, a rotating shaft, and means to intermittently connect the shaft and screw to move the lens.

18. In a device of the character described, a film-chamber having an elongated opening, a film-holder in the chamber, a lens having a closure for the opening, mechanism for intermittently moving the lens laterally across the film, means periodically operated from the lens-moving mechanism to move the film across the lens, and a shutter exposing the lens between its intervals of movement.

19. In a device of the character described, a film-chamber having an elongated opening, a film-holder in the chamber, a lens having a closure for the opening, an endless reverse screw to move the lens across the film, a revolving shutter, a rotating shaft, means to intermittently connect the shaft and screw to move the lens, and means to revolve the shutter from the shaft.

In testimony whereof I affix my signature in presence of two witnesses.

BRUCE BORLAND.

Witnesses:
GEORGE R. HARBAUGH,
J. McROBERTS.